US011568399B2

(12) United States Patent
Ikegawa et al.

(10) Patent No.: US 11,568,399 B2
(45) Date of Patent: Jan. 31, 2023

(54) DISTRIBUTED LEDGER MANAGEMENT SYSTEM, DISTRIBUTED LEDGER MANAGEMENT METHOD, AND NODE

(71) Applicant: HITACHI, LTD., Tokyo (JP)

(72) Inventors: Koshi Ikegawa, Tokyo (JP); Nao Nishijima, Tokyo (JP); Yoji Ozawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 6 days.

(21) Appl. No.: 17/191,983

(22) Filed: Mar. 4, 2021

(65) Prior Publication Data

US 2022/0005025 A1 Jan. 6, 2022

(30) Foreign Application Priority Data

Jul. 6, 2020 (JP) .............................. JP2020-116659

(51) Int. Cl.
*G06Q 20/38* (2012.01)
*G06Q 20/40* (2012.01)
*H04L 67/104* (2022.01)
*H04L 67/1074* (2022.01)
*H04L 9/06* (2006.01)
*H04L 9/00* (2022.01)

(52) U.S. Cl.
CPC ......... *G06Q 20/389* (2013.01); *G06Q 20/401* (2013.01); *H04L 9/0643* (2013.01); *H04L 67/1044* (2013.01); *H04L 67/1074* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2018/0129700 A1* | 5/2018 | Naccache | G06F 16/9024 |
| 2020/0076571 A1* | 3/2020 | Natarajan | G06F 16/2379 |
| 2020/0364205 A1* | 11/2020 | Novotny | G06F 16/2379 |
| 2020/0389518 A1* | 12/2020 | Zhang | H04L 67/108 |
| 2021/0224776 A1* | 7/2021 | Hundia | G06Q 20/389 |

OTHER PUBLICATIONS

Gorenflo, "FastFabric: Scaling Hyperledger Fabric to 20,000 Transactions per Second", IEEE, 2019. (Year: 2019).*
Androulaki, "Hyperledger Fabric: A distributed operating system for permissioned blockchains", EuroSys 2018 conference, 2018. (Year: 2018).*

(Continued)

*Primary Examiner* — Abdulmajeed Aziz
(74) *Attorney, Agent, or Firm* — Volpe Koenig (57) ABSTRACT

A distributed ledger management system 10 includes: an orderer node 100 that generates a block containing transactions issued by a client 300, verifies the validity of the transactions contained in the block, distributes the block and verification results to a peer node 200, adds the block to a blockchain 125 in its storage device, and stores the verification results in its storage device; and the peer node 200 that receives the block and verification results from the orderer node 100, adds information on predetermined events indicated by the transactions to state information 225 in a storage device of the peer node, and discards the block and verification results.

4 Claims, 8 Drawing Sheets

(56) References Cited

OTHER PUBLICATIONS

Thakkar, "Performance benchmarking and optimizing Hyperledger Fabric Blockchain Platform" IEEE International Symposium on the Modeling, Analysis and Simulation of Computer and Telecom Systems, 2018. (Year: 2018).*

Tam, "Examining the Behaviour of Hyperledger Fabricwhen World State is Tampered", medium.com, 2019. (Year: 2019).*

Introduction of Ledger Archiving, Technical Overview: block Archiver feature, Hyperledger Labs/fabric-block/archiving, 7 pgs.

* cited by examiner

| BLOCK | BLOCKCHAIN | | VERIFICATION INFORMATION DB |
|---|---|---|---|
| | TRANSACTION (621 / 227) | STATE VERSION (622) | VERIFICATION INFORMATION (228 / 631) |
| Genesis | – | – | – |
| 1 | a=0 | v0 | valid |
| | b=0 | v0 | valid |
| | b=0 | v0 | invalid |
| 2 | a+=1 | v1 | valid |
| | c=0 | v0 | valid |
| | a+=1 | v1 | invalid |
| 3 | b+=1 | v1 | valid |
| | a+=1 | v2 | valid |
| | c+=1 | v1 | valid |

DISTRIBUTED LEDGER MANAGEMENT SYSTEM, DISTRIBUTED LEDGER MANAGEMENT METHOD, AND NODE

CROSS-REFERENCE TO RELATED APPLICATION

This application claims priority pursuant to Japanese patent application No. 2020-116659, filed on Jul. 6, 2020, the entire disclosure of which is incorporated herein by reference.

BACKGROUND

Technical Field

The present disclosure relates to a distributed ledger management system, a distributed ledger management method, and a node.

Related Art

Distributed ledger technology using blockchain has appeared as a technology to replace transactions which have conventionally been made via a reliable central authority such as a financial institution or a government with transactions made directly between users in a peer-to-peer (P2P) manner.

Various derivative technologies of distributed ledger technology have been proposed and evolved. Currently, distributed ledger technology has the following main characteristics: (1) a transaction between participants of a distributed ledger is established not through a central authority, but through consensus building and approval by (any or specific) participants, (2) a plurality of transactions are bundled into a block, which is recorded like a chain in a distributed ledger called a blockchain, and the successive blocks are hashed, which makes it practically impossible to falsify them, and (3) all the participants share the same ledger data so that every participant can check transactions.

Due to the above characteristics, distributed ledger technology using blockchain is being considered to be applied to a wide variety of sectors, such as finance and manufacturing industries, as a system for reliable management and sharing of data or execution and management of transactions based on contracts.

In a distributed ledger system implemented by such technology, a plurality of constituent nodes share information (a ledger) as follows: a transaction is accepted through consensus built between the nodes based on a predetermined consensus standard, and each of the nodes executes the transaction and holds the result of the transaction.

In this case, all the peer nodes in the distributed ledger system have the ledger, and accordingly the total amount of data in the entire distributed ledger system tends to increase monotonically over time, leading to a problem of straining the storage resources. To address this problem, various approaches have been taken as shown in, for example, US Patent Application No. 20180129700 (Patent Literature 1) and Hyperledger Labs/fabric-block-archiving (Non-patent literature 1).

Of these conventional techniques, the technique shown in Patent Literature 1 achieves reducing an amount of data in the entire system by collecting the contents of transactions of an unspent transaction output (UTXO) type. However, this technique is not applicable to a blockchain handling transactions not of the UTXO type.

Non-patent literature 1 proposes an approach where peer nodes belonging to each organization do not have the entire blockchain, and the blockchain is stored in an archiver in each organization.

With this approach, however, block chains that need to be stored are as many as the sum of the orderer nodes and organizations, and a sufficient reduction in data amount cannot be achieved. Also, the blockchain in an orderer node is not given verification information on transactions (information for identifying whether the transactions are valid or invalid), and thus cannot be appropriately utilized after that.

SUMMARY

The present disclosure has an objective to provide a technique for enabling a reduction in the total amount of data in the entire system in an appropriate way irrespective of the type of transactions.

A distributed ledger management system of the present disclosure to solve the above problem comprises one or more peer nodes and one orderer node, the orderer node configured to receive transactions issued by a client, generate a block containing the transactions, verify validity of each of the transactions contained in the block, distribute the block and results of the verification to each of the peer nodes, add the block to a blockchain in a storage device of the orderer node, and store the results of the verification in the storage device of the orderer node, and the peer node configured to receive the block and the results of the verification from the orderer node, add information on a predetermined event indicated by each of the transactions to state information in a storage device of the peer node based on the block and the results of the verification, and discard the block and the results of the verification received.

A distributed ledger management method of the present disclosure performed by a distributed ledger management system formed by one or more peer nodes and one orderer node, the method comprises: the orderer node receiving transactions issued by a client, generating a block containing the transactions, verifying validity of each of the transactions contained in the block, distributing the block and results of the verification to each of the peer nodes, adding the block to a blockchain in a storage device of the orderer node, and storing the results of the verification in the storage device of the orderer node, and the peer node receiving the block and the results of the verification from the orderer node, adding information on a predetermined event indicated by each of the transactions to state information in a storage device of the peer node based on the block and the results of the verification, and discarding the block and the results of the verification received.

An orderer node of the present disclosure forming a distributed ledger management system, the orderer node comprises a communication device that communicates with a peer node and a client on the distributed ledger management system via a network; and an arithmetic device configured to receive, via the communication device, transactions issued by the client to the orderer node, generate a block containing the transactions, verify validity of each of the transactions contained in the block, distribute the block and results of the verification to the peer node via the communication device, add the block to a blockchain in a storage device of the orderer node, and store the results of the verification in the storage device of the orderer node.

A peer node of the present disclosure forming a distributed ledger management system, the peer node comprises a communication device that communicates with an orderer node on the distributed ledger management system via a network; and an arithmetic device configured to receive, from the orderer node via the communication device, a block containing transactions from a client on the distributed ledger management system and results of verification about validity of each of the transactions contained in the block, add information on a predetermined event indicated by each of the transactions to state information in a storage device of the peer node based on the block and the results of the verification, and discard the block and the results of the verification received.

The present disclosure can reduce the total amount of data in the entire system in an appropriate way irrespective of the type of transactions.

BRIEF DESCRIPTION OF THE DRAWINGS

FIG. 7 is a diagram showing an example configuration of a blockchain and a verification information DB of the present embodiment.

DETAILED DESCRIPTION OF EMBODIMENTS

<<Network Configuration>>

Figure 1:
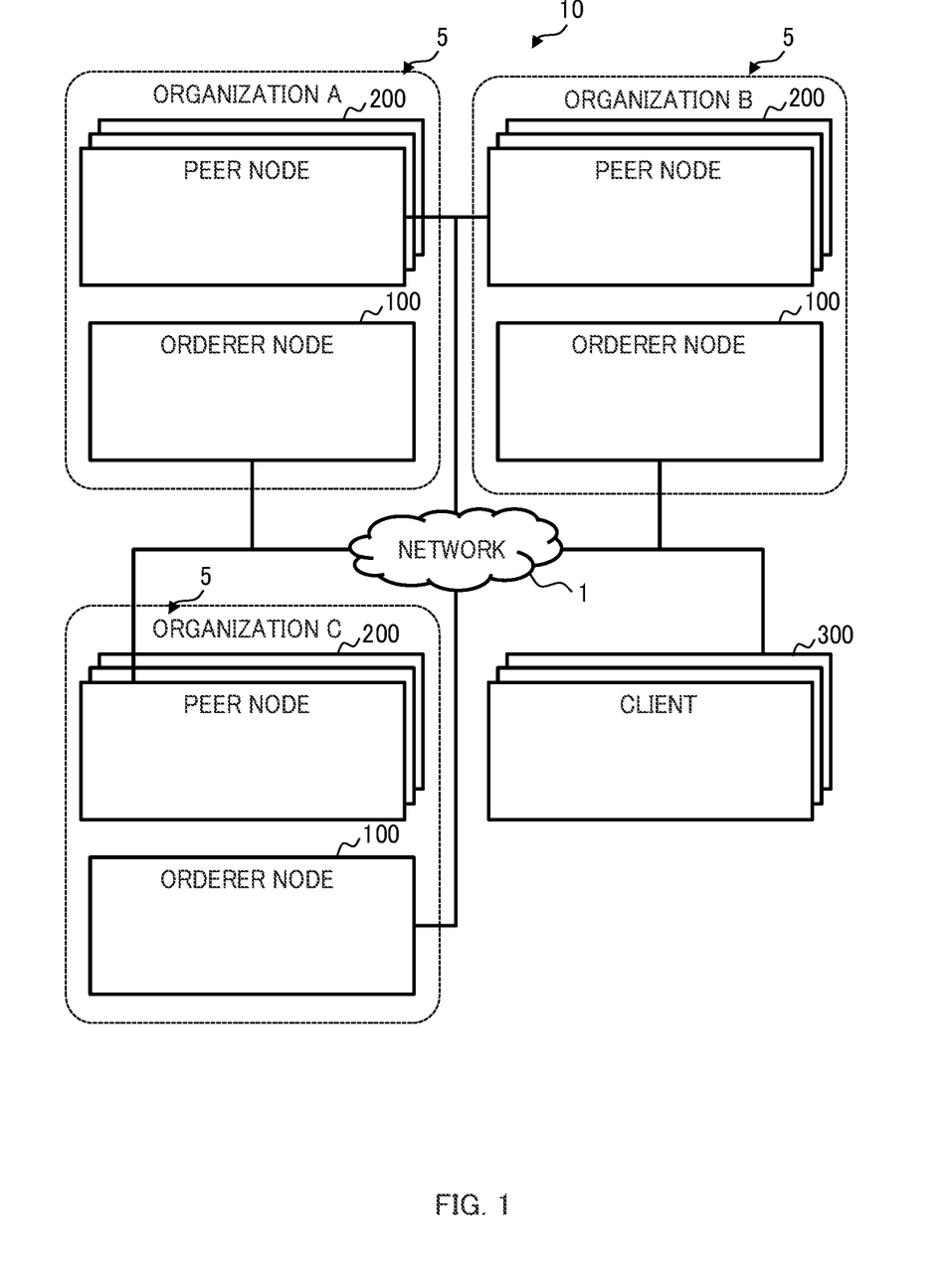
FIG. 1 is a diagram showing an example configuration of a blockchain network of the present embodiment.

An embodiment of the present disclosure is described in detail below using the drawings. FIG. 1 is a diagram showing an example configuration of a blockchain network of the present embodiment. The blockchain network shown in FIG. 1 corresponds to a distributed ledger management system 10 (hereinafter referred to as a blockchain network 10) of the present disclosure.

The blockchain network 10 includes distributed ledger systems 5 of one or more organizations. The blockchain network 10 also includes one or more clients 300.

In such a configuration, the distributed ledger systems 5 of the respective organizations are communicatively coupled to one another via a network 1.

The distributed ledger system 5 of each organization is formed by one or more peer nodes 200 and one orderer node 100.

<<Hardware Configuration>>

Figure 2:
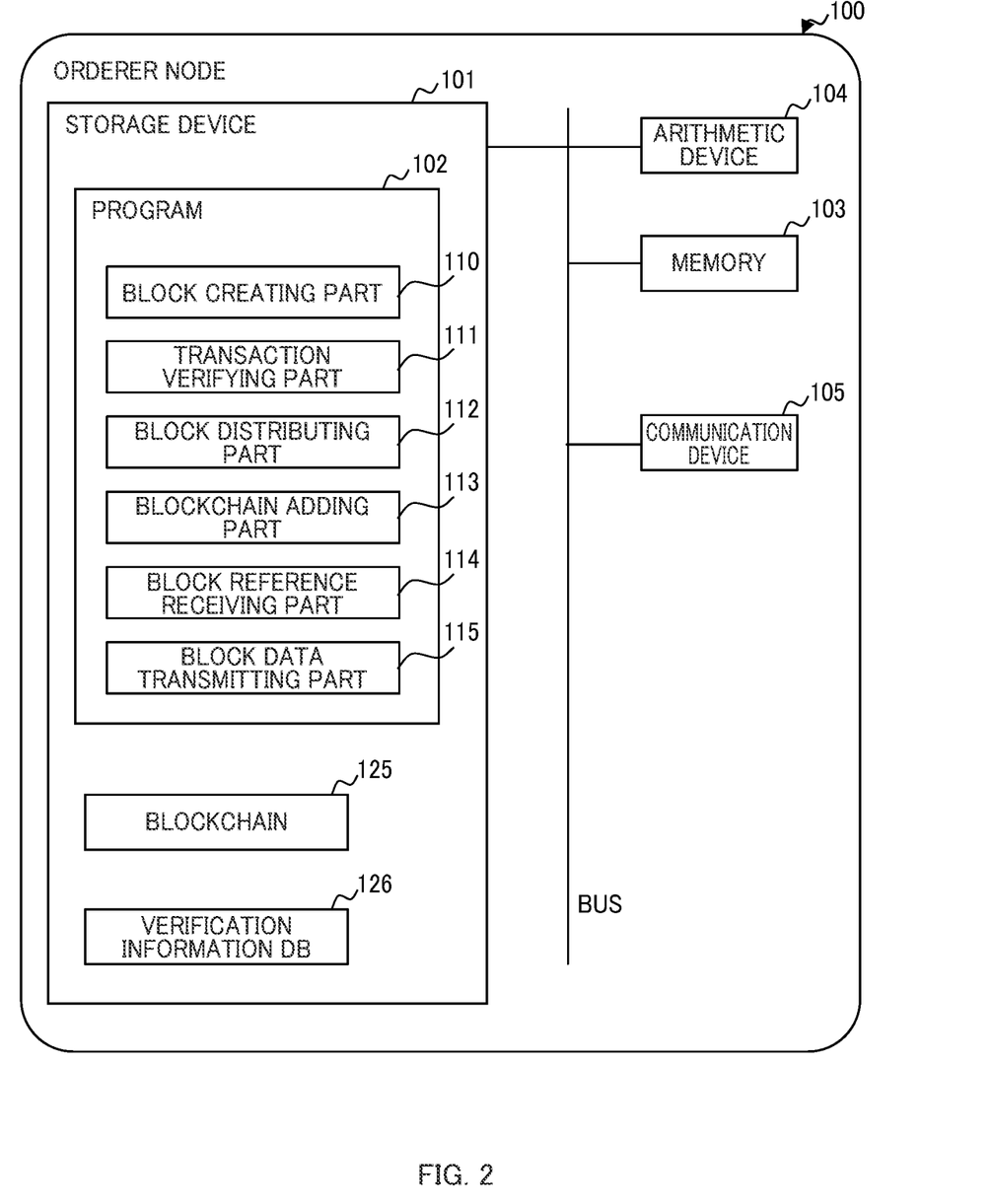
FIG. 2 is a diagram showing an example hardware configuration of an orderer node of the present embodiment.

The following provides the hardware configuration of each node constituting the distributed ledger management system 10 of the present embodiment. FIG. 2 is a diagram showing an example hardware configuration of the orderer node 100 of the present embodiment.

The orderer node 100 includes a storage device 101, a memory 103, an arithmetic device 104, and a communication device 105.

The storage device 101 is formed by an appropriate non-volatile memory device such as a solid-state drive (SSD) or a hard disk drive.

The memory 103 is formed by a volatile memory device such as a random-access memory (RAM).

The arithmetic device 104 is a CPU that performs overall control of the node and various kinds of processing such as determination, computation, and control by loading a program 102 stored in the storage device 101 to, for example, the memory 103 and executing the program 102.

The orderer node 100 includes, as operation modules implemented by the execution of the program 102, a block creating part 110, a transaction verifying part 111, a block distributing part 112, a blockchain adding part 113, a block reference receiving part 114, and a block data transmitting part 115.

The block creating part 110 packages data on transactions into one block.

The transaction verifying part 111 verifies whether each transaction packaged in the block is valid or invalid.

The block distributing part 112 distributes the block to the one or more peer nodes 200.

The blockchain adding part 113 adds the block newly generated by the block creating part 110 to a blockchain 125 stored in the storage device 101 of the orderer node 100.

The block reference receiving part 114 receives a block reference request from a client 300.

In response to the block reference request received from the client 300, the block data transmitting part 115 extracts requested block data from the blockchain 125 and returns the block data.

The communication device 105 in the orderer node 100 is a network interface card which is coupled to the network 1 to allow communications with other nodes.

The storage device 101 stores, in addition to the program 102 for implementing necessary functions as the orderer node 100 of the present embodiment, at least the blockchain 125 and a verification information database (DB) 126.

The blockchain 125 is blockchain data that only the orderer node 100 has. The verification information DB 126 is a database storing verification results on transactions in a block which are obtained by the transaction verifying part 111.

Figure 3:
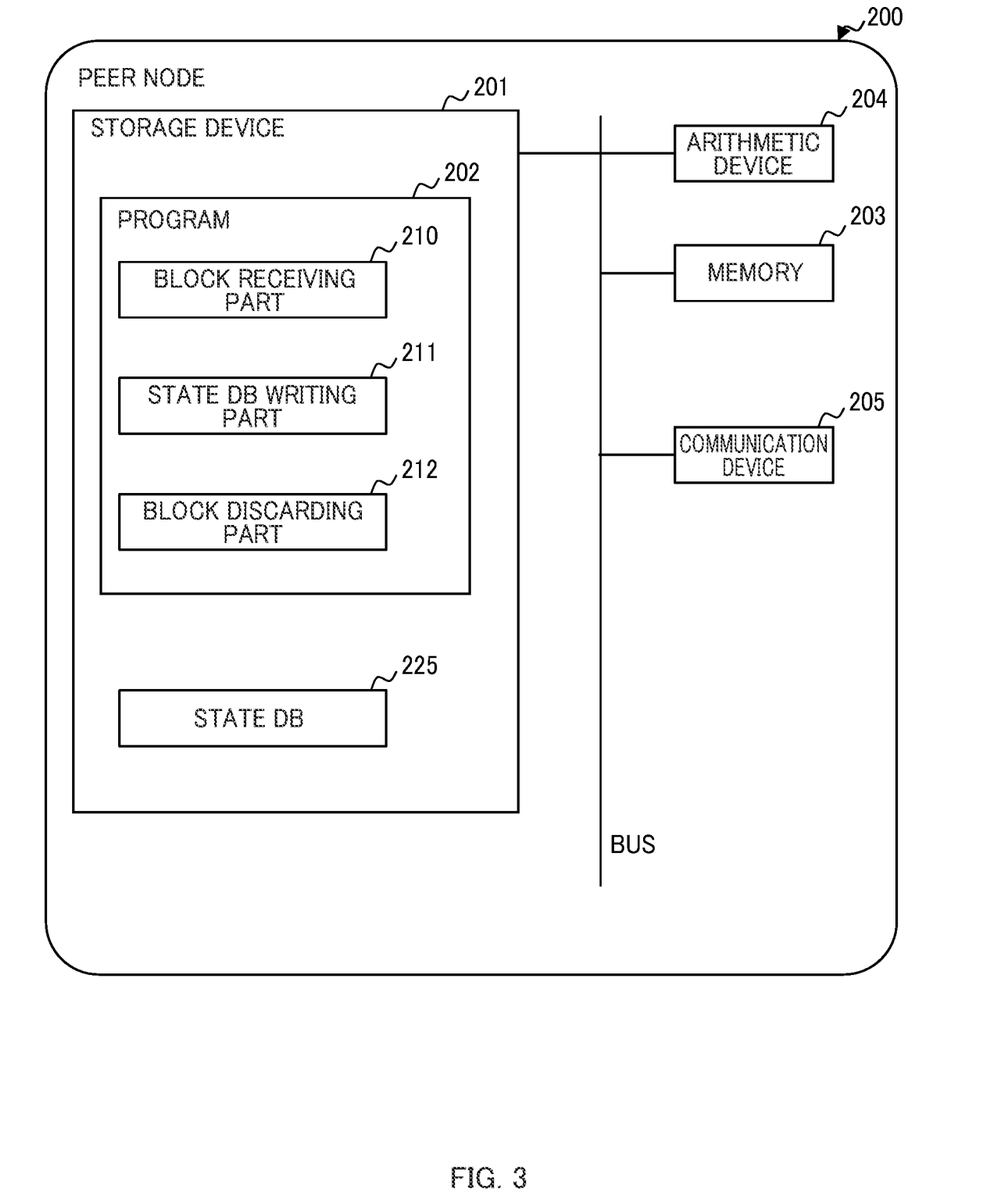
FIG. 3 is a diagram showing an example hardware configuration of a peer node of the present embodiment.

Next, FIG. 3 shows an example hardware configuration of the peer node 200 of the present embodiment. The peer node 200 includes a storage device 201, a memory 203, an arithmetic device 204, and a communication device 205.

The storage device 201 is formed by an appropriate non-volatile memory device such as a solid-state drive (SSD) or a hard disk drive.

The memory 203 is formed by a volatile memory device such as a RAM.

The arithmetic device 204 is a CPU that performs overall control of the node and various kinds of processing such as determination, computation, and control by loading a program 202 stored in the storage device 201 to, for example, the memory 203 and executing the program 202.

The peer node 200 includes, as operation modules implemented by the execution of the program 202, a block receiving unit 210, a state DB writing unit 211, and a block discarding unit 212.

The block receiving unit 210 receives a block distributed from the orderer node 100.

The state DB writing unit 211 reads transactions stored in the block received from the orderer node 100 and writes data into a state DB 225 based on the transactions.

The block discarding unit 212 discards the block received from the orderer node 100.

The communication device 205 in the peer node 200 is a network interface card which is coupled to the network 1 to allow communications with other nodes.

The storage device 201 stores, in addition to the program 202 for implementing necessary functions as the peer node 200 of the present embodiment, at least the state DB 225. The state DB 225 has a configuration and a function similar to those of a typical state DB in blockchain technology.

Figure 4:
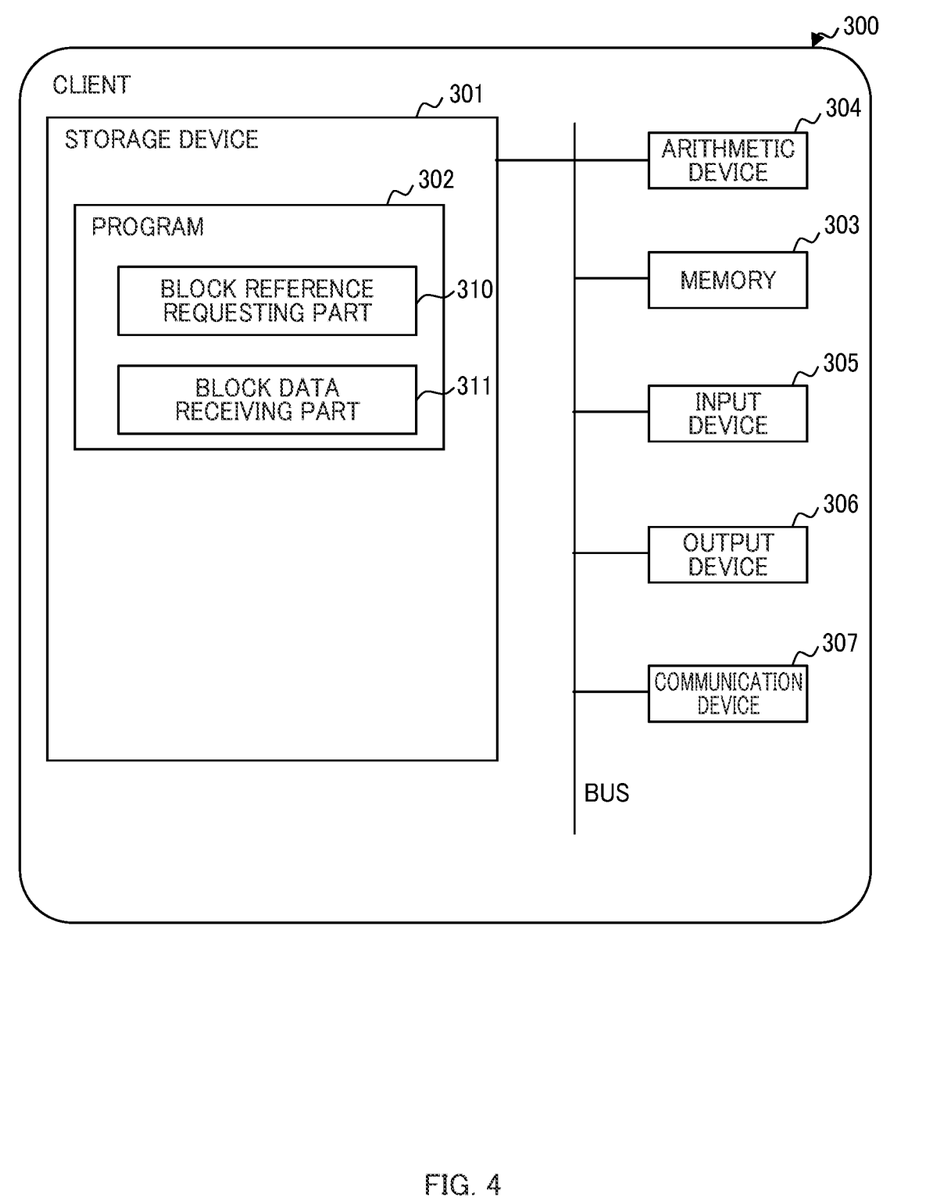
FIG. 4 is a diagram showing an example hardware configuration of a client of the present embodiment.

Next, FIG. 4 shows an example hardware configuration of the client 300 of the present embodiment. The client 300 includes a storage device 301, a memory 303, an arithmetic device 304, an input device 305, an output device 306, and a communication device 307.

The storage device 301 is formed by an appropriate non-volatile memory device such as a solid-state drive (SSD) or a hard disk drive.

The memory 303 is formed by a volatile memory device such as a RAM.

The arithmetic device 304 is a CPU that performs overall control of the node and various kinds of processing such as determination, computation, and control by loading a program 302 stored in the storage device 301 to, for example, the memory 303 and executing the program 302.

The client 300 includes, as operation modules implemented by the execution of the program 302, a block reference requesting part 310 and a block data receiving part 311.

The block reference requesting part 310 sends the orderer node 100 a request to refer to a past block.

The block data receiving part 311 receives block data sent from the orderer node 100 that has received the block reference request.

The input device 305 of the client 300 is any appropriate device such as a keyboard, a mouse, or a microphone that receives a key input or a voice input from a user.

The output device 306 is any appropriate device such as a display or a speaker that presents data processed by the arithmetic device 304.

The communication device 307 in the client 300 is a network interface card which is coupled to the network 1 to allow communications with other nodes.

<<Example Flowchart: Creating, Distributing, and Discarding a Block>>

Actual procedures of the distributed ledger management method of the present embodiment are described below based on the drawings. The various operations corresponding to the distributed ledger management method that are described below are implemented by the programs loaded to the memories or the like and executed by the orderer node 100, the peer node 200, and the client 300 constituting the distributed ledger management system 10. The programs are formed by codes for executing the various operations described below.

Figure 5:
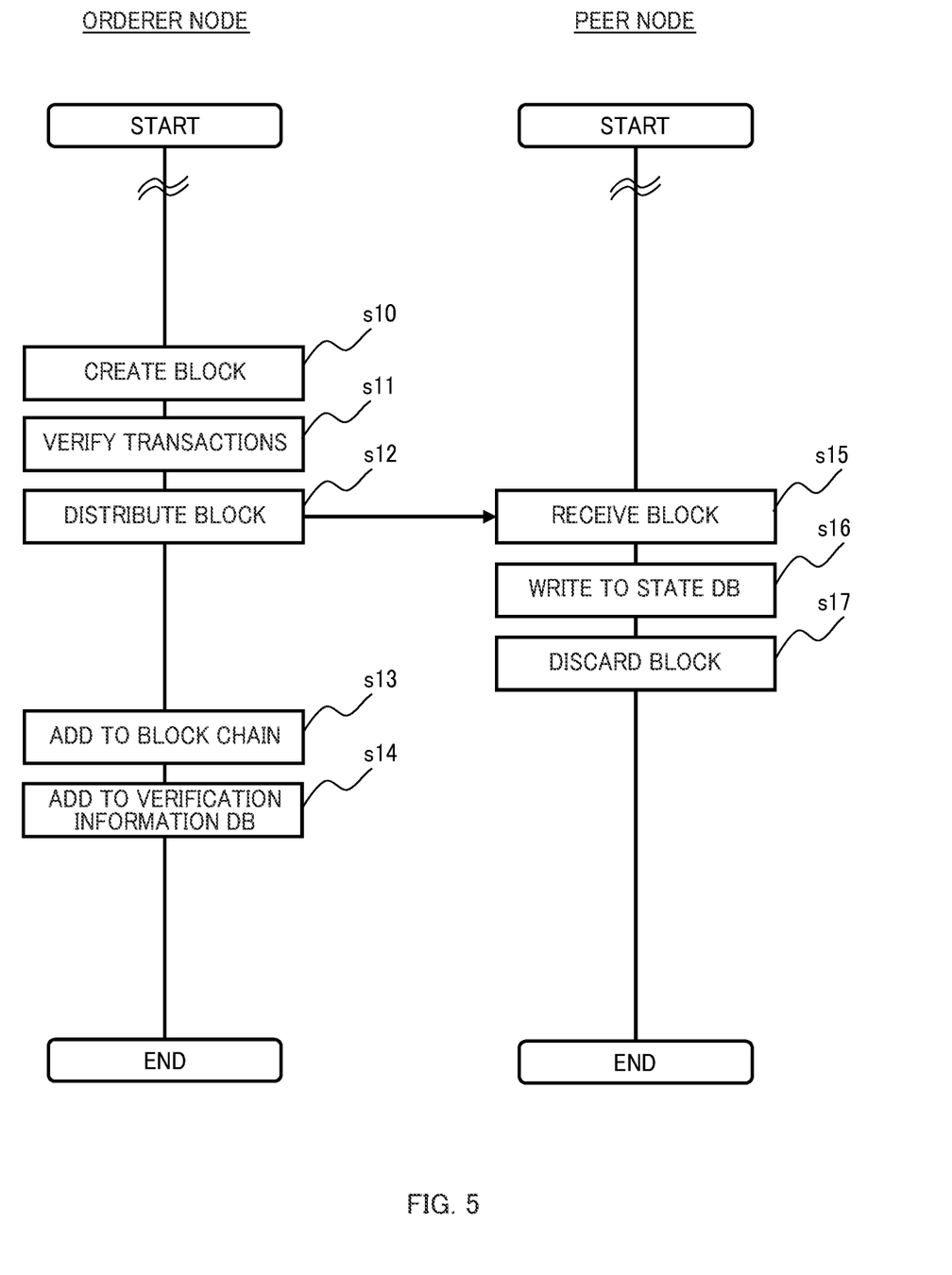
FIG. 5 is a diagram showing an example flowchart of a distributed ledger management method of the present embodiment.

FIG. 5 is an example flowchart of the distributed ledger management method of the present embodiment, or more specifically, a diagram showing how the orderer node 100 creates a block and distributes the block to the peer nodes 200.

First, using the block creating part 110, the orderer node 100 creates a block by bundling transactions (s10). These transactions are, for example, ones issued by the clients 300 in a certain period of time.

Next, using the transaction verifying part 111, the orderer node 100 verifies the transactions in the block created in s10 above (s11). Details of this transaction verification processing will be given later.

Next, using the block distributing part 112, the orderer node 100 distributes the block created in s10 above and the results of the verification obtained in s11 (hereinafter referred to as verification information) to the peer nodes 200 (s12).

Using the blockchain adding part 113, the orderer node 100 also adds the block created in s10 to the blockchain 125 stored in its storage device 101 (s13).

The orderer node 100 also adds the verification information obtained in s11 above to the verification information DB 126 stored in its storage device 101 (s14), and ends the processing.

Meanwhile, using the block receiving unit 210, the peer node 200 receives the block and verification information distributed from the orderer node 100 (s15).

Then, using the state DB writing unit 211, the peer node 200 writes data into the state DB 225 based on the block and verification information received from the orderer node 100 in s15 (s16).

Also, using the block discarding unit 212, the peer node 200 discards the block and verification information received from the orderer node 100 in s15 (s17), and the processing ends.

<<Example Flowchart: Verifying Transactions>>

Figure 6:
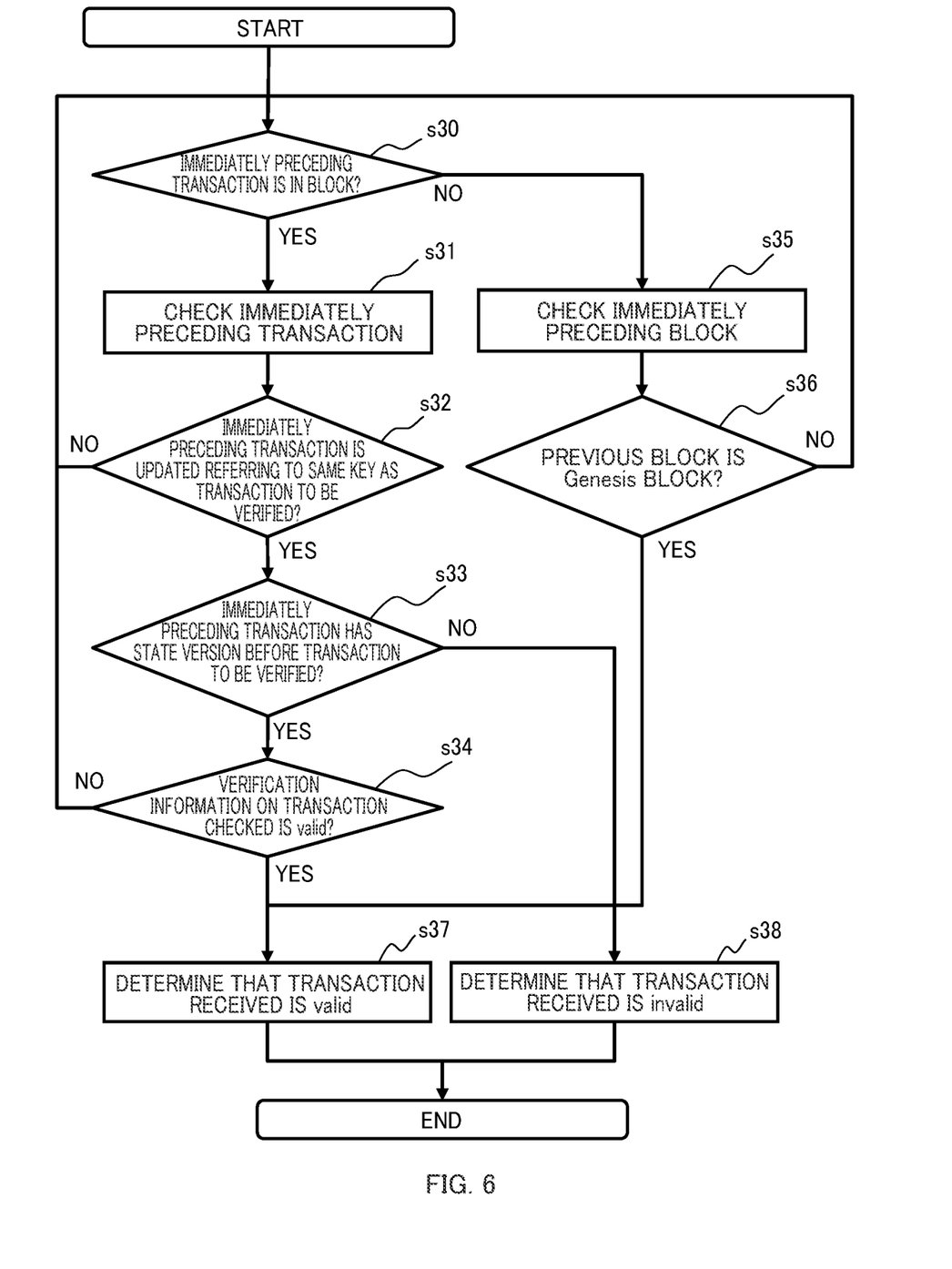
FIG. 6 is a diagram showing an example flowchart of the distributed ledger management method of the present embodiment.

Next, details of the transaction verification in s11 in the flowchart in FIG. 5 are given based on the flowchart in FIG. 6.

The transaction verifying part 111 of the orderer node 100 determines whether the block that a transaction to be verified belongs has another transaction immediately preceding the transaction checked in the previous loop (a series of verification processing from s30 to s36) (or immediately preceding the transaction to be verified if this is the first loop) (s30).

If it is determined that there is another transaction (s30: YES), the transaction verifying part 111 proceeds to s31. If it is determined that there is no other transaction (s30: NO), the transaction verifying part 111 proceeds to s32.

In s31, the transaction verifying part 111 reads the contents of the immediately preceding transaction identified in s30, and proceeds to s32.

Next, the transaction verifying part 111 determines whether the transaction to be verified and the immediately preceding transaction the contents of which have been read in s31 are updated with reference to the same key (s32).

If it is determined that the transaction to be verified and the immediately preceding transaction are updated with reference to the same key (s32: YES), the transaction verifying part 111 proceeds to s33.

If it is determined that the transaction to be verified and the immediately preceding transaction are not updated with reference to the same key (s32: NO), the transaction verifying part 111 proceeds back to s30.

Next, the transaction verifying part 111 determines whether the state version of the transaction to be verified is one that is one version ahead of the state version of the transaction the contents of which have been read in s31 (s33).

If it is determined that the state version is one version ahead (s33: YES), the transaction verifying part 111 proceeds to s34. If it is determined that the state version is not one version ahead (s33: NO), the transaction verifying part 111 proceeds to s38.

Then the transaction verifying part 111 determines whether the verification information on the transaction the contents of which have been read in s31 is "valid" (s34).

If it is determined that the verification information is "valid" (s34: YES), the transaction verifying part 111 proceeds to s37.

If it is determined that the verification information is not "valid," i.e., is invalid (s34: NO), the transaction verifying part 111 proceeds back to s30.

Now, the description is moved back to the decision box of s30. If it is determined in s30 that there is no other transaction (s30: NO), the transaction verifying part 111 reads the contents of the block preceding the block to which the transaction checked in the previous loop belongs (s35), and proceeds to s36.

The transaction verifying part 111 determines whether the preceding block the contents of which have been read in s35 is a Genesis block (s36).

If it is determined that the preceding block is a Genesis block (s36: YES), the transaction verifying part 111 proceeds to s37.

If it is determined that the preceding block is not a Genesis block (s36: NO), the transaction verifying part 111 proceeds back to s30.

In Step s37, the transaction verifying part 111 determines that the transaction to be verified is valid, or successfully verified, and ends the processing. In Step s38, the transaction verifying part 111 determines that the transaction to be verified is invalid, or unsuccessfully verified, and ends the processing.

The transaction verifying part 111 stores and manages the thus-obtained verification result in the verification information DB 126, linking the verification result with the transaction to be verified.

FIG. 7 shows the blockchain 125 and the verification information DB 126, which are stored in the storage device 101 of the orderer node 100 of the present embodiment, in a merged format for better understanding. In the example illustrated, the blockchain 125 includes a chain of blocks: a Genesis block in the forefront and blocks 1 to 3.

Each of the blocks except for the Genesis block includes transactions 621 packaged into the block and state versions 622 of the transactions 621. In FIG. 7, the transactions included in each block are each linked with its verification information 631.

The configuration of each transaction is described below. A Genesis block includes no transaction, and therefore a transaction 601 is empty.

A transaction 602 is a transaction in a block 1 for creating key a and assigning 0. Since the key has been newly created, the state version is v0. The verification information is "valid."

A transaction 603 is a transaction in the block 1 for creating key b and assigning 0. Since the key has been newly created, the state version is v0. The verification information is "valid."

A transaction 604 is a transaction in the block 1 for creating key b and assigning 0. Since the key has been newly created, the state version is v0. However, since key b has already been newly created, the verification information is "invalid" due to the conflict.

A transaction 605 is a transaction in a block 2 for incrementing key a by one. The state version is changed to v1 with reference to v0. The verification information is "valid."

A transaction 606 is a transaction in the block 2 for creating key c and assigning 0. The state version is v0 since the key is newly created. The verification information is "valid."

The transaction 607 is a transaction in the block 2 for incrementing key a by one. The state version is changed to v1 with reference to v0. However, the verification information is "invalid" because the transaction 605 that changes the state version v0 to v1 is "valid."

A transaction 608 is a transaction in a block 3 for incrementing key b by one. The state version is changed to v1 with reference to v0. The verification information is "valid."

A transaction 609 is a transaction in the block 3 for incrementing key a by one. The state version is changed to v2 with reference to v1. The verification information is "valid."

A transaction 610 is a transaction in the block 3 for incrementing key c by one. The state version is changed to v1 with reference to v0. The verification information is "valid."

<<Example Flowchart: Referring to a Block>>

Figure 8:
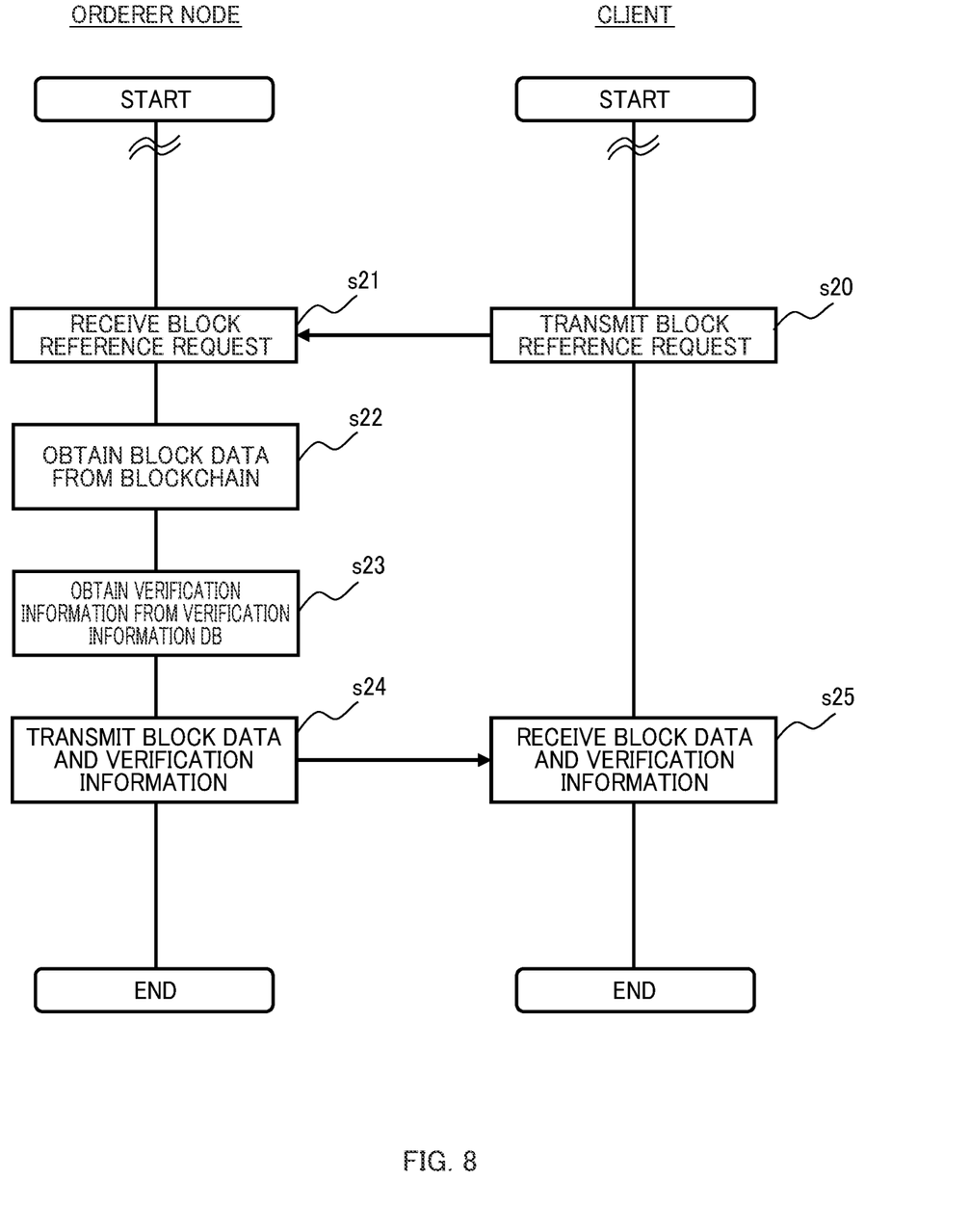
FIG. 8 is a diagram showing an example flowchart of the distributed ledger management method of the present embodiment.

Next, FIG. 8 shows a flowchart in which the orderer node 100 responds to a request to refer to a past block from the client 300 in the flowchart of the distributed ledger management method of the present embodiment.

Using the block reference requesting part 310, the client 300 transmits a block reference request to the orderer node 100 (s20). This block reference request contains identification information on a block, such as an ID.

Then, using the block reference receiving part 114, the orderer node 100 receives the block reference request sent from the client 300 (s21).

The orderer node 100 obtains block data from the blockchain 125 stored in its storage device 101 based on the identification information indicated by the block reference request received in s21 (s22).

The orderer node 100 obtains the verification information on the block data obtained in s22, from the verification information DB 126 stored in its storage device 101 (s23).

Next, the orderer node 100 transmits the block data obtained in s22 and its verification information obtained in s23 to the client 300 (s24).

The client 300 receives the block data and the verification information transmitted from the orderer node 100 (s25), presents them through the output device 306 for example, and ends the processing.

<<Other Examples>>

In the flowchart in FIG. 8, the orderer node 100 receives a block reference request directly from the client 300. Alternatively, this processing may be done via the peer node 200 as follows: the client 300 transmits a block reference request to the peer node 200, and the peer node 200 transfers the block reference request to the orderer node 100. In this case, the peer node 200 responds to the client 300 with the block data and verification information obtained from the orderer node 100.

The best mode for carrying out the invention and the like have been described above specifically, but the present disclosure is not limited to those. Various modifications can be made without departing from the gist of the present disclosure.

The present embodiment described above can reduce the total data amount in the entire system in an appropriate way irrespective of the type of transactions.

At least the following are demonstrated by the above descriptions herein. In the distributed ledger management system of the present embodiment, upon receipt of a block reference request from the client, the orderer node may extract a target block indicated by the block reference request from the blockchain stored in the storage device of the orderer node, extract, from the results of the verification stored in the storage device of the orderer node, ones that are about the transactions forming the target block, and return the target block and the results of the verification thus extracted to the client.

Thereby, to a block reference request from a user of the client, the orderer node can respond with information on the block being requested. In other words, it can be said that without each peer node having to hold the blockchain, a reference request from a user can be responded to accurately. Thus, the present embodiment can reduce the total data amount in the entire system in an appropriate way irrespective of the type of transactions.

The distributed ledger management method of the present embodiment may further comprise causing the orderer node to, upon receipt of a block reference request from the client, extract a target block indicated by the block reference request from the blockchain stored in the storage device of the orderer node, extract, from the results of the verification stored in the storage device of the orderer node, ones that are about the transactions forming the target block, and return the target block and the results of the verification thus extracted to the client.

In the orderer node of the present embodiment, upon receipt of a block reference request from the client, the arithmetic device may extract a target block indicated by the block reference request from the blockchain stored in the storage device of the orderer node, extract, from the results of the verification stored in the storage device in the orderer node, ones that are about the transactions forming the target block, and return the target block and the results of the verification thus extracted to the client.

What is claimed is:

1. A distributed ledger management system comprising:
   a plurality of peer nodes, each comprising a peer node processor and a peer node storage device and
   two orderer nodes, each comprising an order node processor and an orderer node storage device,
   at least one of the two orderer nodes configured to
      receive transactions having a plurality of transaction types issued by a client,
      generate a block containing the transactions,
      verify validity of each of the transactions contained in the block, according to a consensus mechanism that checks a blockchain in the two orderer nodes for transaction validation and a state version in the plurality of peer nodes against each of the transactions requiring verification,
      distribute the block and results of the verification to each of the plurality of peer nodes,
      add the block to the blockchain in the order node storage device of each of the two orderer nodes, and store the results of the verification in the orderer node storage device of each of the two orderer nodes,
   wherein at least one of the two orderer nodes is further configured to:
      determine that the block in which a first transaction to be verified belongs to has a second transaction immediately preceding the first transaction during a first transaction verification loop,
      read the contents of the second transaction,
      update the first transaction to be verified and the second transaction to the same reference key,
      in response to determining that the state version of the first transaction to be verified is one version ahead of the second transaction to be verified according to the plurality of peer nodes, verify that the first transaction to be verified is valid due to both transactions being deemed valid,
   and
   the plurality of peer nodes each configured to
      receive the block and the results of the verification from the orderer node,
      add information on a predetermined event indicated by each of the transactions to the state version in the peer node storage device of each the plurality of peer nodes based on the block and the results of the verification, and
      discard the block and the results of the verification received irrespective of the transaction type or types contained in the block, and wherein none of the plurality of peer nodes stores the blockchain.

2. The distributed ledger management system according to claim 1, wherein
   upon receipt of a block reference request from the client, at least one of the two orderer nodes extracts:
      a target block indicated by the block reference request from the blockchain stored in the orderer node storage device of each of the orderer node,
      transactions forming the target block, from the results of the verification stored in the orderer node storage device of each of the orderer node, and
   returns the extracted target block and the extracted transactions forming the target block to the client.

3. A distributed ledger management method with operations in a computer program stored in each memory of a plurality of peer nodes and two orderer nodes executed by a respective computer processor and forming a distributed ledger management system, the method comprising:
   at least one of the two orderer nodes receiving transactions having a plurality of transaction types issued by a client,
   generating a block containing the transactions,
   verifying validity of each of the transactions contained in the block
   according to a consensus mechanism that checks a blockchain in the two orderer nodes for transaction validation and a state version in the plurality of peer nodes against each of the transactions requiring verification,
   distributing the block and results of the verification to each of the plurality of peer nodes,
   adding the block to the blockchain in a storage device of each of the two orderer node,
   storing the results of the verification in the storage device of each of the two orderer node,
   determining that the block in which a first transaction to be verified belongs to has a second transaction immediately preceding the first transaction during a first transaction verification loop,
   reading the contents of the second transaction,
   updating the first transaction to be verified and the second transaction to the same reference key,
   in response to determining that the state version of the first transaction to be verified is one version ahead of the second transaction to be verified according to the plurality of peer nodes, verifying that the first transaction to be verified is valid due to both transactions being deemed valid, and
   the plurality of peer nodes each receiving the block and the results of the verification from the orderer node, adding information on a predetermined event indicated by each of the transactions to state information in a storage device of each of the plurality of peer nodes based on the block and the results of the verification, and discarding the block and the results of the verification received irrespective of the transaction type or types contained in the block, and wherein none of the plurality of one or more peer nodes stores the blockchain.

4. The distributed ledger management method according to claim 3, further comprising:

at least one of the two orderer node, upon receipt of a block reference request from the client:

extracting a target block indicated by the block reference request from the blockchain stored in the storage device of the at least one of the two orderer node, transactions forming the target block from the results of the verification stored in the storage device of the at least one of the two orderer node, and returning the extracted target block and the transactions forming the target block to the client.

\* \* \* \* \*